United States Patent
Hall

(10) Patent No.: US 7,706,117 B2
(45) Date of Patent: Apr. 27, 2010

(54) BUOYANT GROUNDING TERMINAL ELECTRODE APPARATUS FOR LIGHTNING PROTECTION

(76) Inventor: Wallace E Hall, 7361 S. Quince St., Centennial, CO (US) 80112

( * ) Notice: Subject to any disclaimer, the term of this patent is extended or adjusted under 35 U.S.C. 154(b) by 0 days.

(21) Appl. No.: 12/012,122

(22) Filed: Jan. 31, 2008

(65) Prior Publication Data
US 2009/0195955 A1 Aug. 6, 2009

(51) Int. Cl.
H05F 3/00 (2006.01)
(52) U.S. Cl. ........................................ 361/117; 361/220
(58) Field of Classification Search ......... 361/117–119, 361/212, 220
See application file for complete search history.

(56) References Cited

U.S. PATENT DOCUMENTS

| 3,919,956 | A | 11/1975 | Invernizzi | |
|---|---|---|---|---|
| 5,036,785 | A | 8/1991 | Kittredge | 114/90 |
| 5,043,527 | A | 8/1991 | Carpenter | 174/2 |
| 6,029,597 | A | 2/2000 | Cutler | 114/343 |
| 6,708,638 | B2 | 3/2004 | Thomson | 114/90 |
| 2002/0126736 | A1 | 9/2002 | Khayrallah et al. | 361/217 |
| 2003/0033968 | A1 | 2/2003 | Thomson | 114/90 |

OTHER PUBLICATIONS

"A Cricital Assessment of the U.S. Code for Lightning Protection on Sailboats" Ewen M. Thomson IEEE Trans. On Electromagnetic Compatibility, vol. 33, No. 2, May 1991.
"An examination of Lightning Strike Grounding Physics" G. B. Moore, G.D. Aulich, W. Rison, Langmuir Laboratory for Atmospheric Research, New Mexico Tech, Socorro, New Mexico (no date given on paper—available at http://www.lightningsafety.com/nlsi_lhm/Radials.pdf).

Primary Examiner—Danny Nguyen

(57) ABSTRACT

The subject invention pertains to a method and apparatus for lightning protection for a vessel or structure operated on a fluid such as water. In a specific embodiment, a sailboat mast or lightning rod collects the lightning charge and a flexible conductive wire is attached to the mast or lightning rod which goes over the side of the vessel. A grounding electrode has buoyancy so that the grounding electrode is substantially kept at the water surface. The grounding electrode and buoyancy may also serve to allow the grounding electrode to hydrodynamic plane at the water surface when moving through the water. The buoyancy place's portions of the grounding electrode both above or below the water line and the buoyancy keeps the electrode substantially positioned with respect to the water surface even if the vessel or structure is heeled.

14 Claims, 6 Drawing Sheets

BUOYANT GROUNDING TERMINAL ELECTRODE APPARATUS FOR LIGHTNING PROTECTION

BACKGROUND OF THE INVENTION

Most lightning protection systems for water-based vessels are intended to provide a continuous conducting path from the point of the lightning attachment into the water to minimize damage to the hull, crew and electronics. A typical marine lightning protection system consists of one or more air terminal, one or more down conductors and one or more grounding conductors. The down conductors and grounding conductors must be of sufficiently low inductance and impedance as to prevent voltage potential from building on components of the system such as the air terminal. A voltage potential buildup could result in an uncontrolled ionization discharge from the air terminal or components of the air terminal to the water surface. The grounding terminal electrode should minimize impedance and voltage potential drop to the earth ground.

DESCRIPTION OF THE PRIOR ART

There are many types of sailboats produced which have little or no lightning protection built into the boat. Prior art devices have been made in various forms including long flexible chains or links of metal as disclosed in U.S. Pat. No. 11,217 to Forbes, a fixed ground attached to the hull as shown in U.S. Pat. No. 2,909,589 to Brooker, a lightning arrestor comprising a reel that is rotate ably mounted on the base on the boat and has a cable wound as disclosed in U.S. Pat. No. 3,483,305 to Bonkowski et al. Or a ground plate as disclosed in U.S. Pat. No. 3,919,956 to Invernizzi. All of these inventions involved underwater structures which are attached to the marine vessel.

U.S. Pat. No. 5,036,785 issued to Kittredge et al. refers to a underwater grounding structure which can be raised above water when there is no threat of lightning to prevent corrosion and marine growth on the grounding structure. This implementation must be built into the design of the vessel. In addition, U.S. Pat. Nos. 6,029,597 and D425,481 issued to Cutler describes a lightning discharge strip with a "plurality of parallel grooves" to take advantage of edge technology to dissipate electrical charges. This conductor may be buried in the ground or may be joined to a structure such as the hull of a vessel.

U.S. Pat. No. 6,708,638 issued to Thomson describes electrodes placed in the vessel hull near the water line or in other areas of the vessel hull. The electrodes incorporate geometry which enhances the local electric field so as to promote a spark connection with the water. This invention is intended to be incorporated into the hull of the marine vessel and if the vessel is heeled over (such as a sailboat sailing), the electrodes may no longer be located near the water line of the vessel.

Another device is the "Srikeshield" dissipator electrode developed by SEYLA Marine. This prior art invention is designed to minimize ground resistance and is designed to be completely immersed with the exception of parts used for mounting.

BRIEF SUMMARY OF THE INVENTION

The subject invention pertains to a method of placing the grounding electrodes in the vicinity of the water surface with the use of buoyancy and a flexible down conductor. Since the grounding electrodes are buoyant or "floating", their relationship to the water surface remains relatively constant. It has been observed in the laboratory that a lightning ionized discharge from the air to water will travel at the water surface once the ionizing path connects with the water. This has been observed in large water tanks where the ionizing discharge takes radial paths on the water surface away from the initial contact point. It has also been observed that if a grounding structure is placed in a vessel filled with water and a discharge electrode is placed some distance above the water but also some distance from the grounding structure, that the ionization path from the discharge electrode will go straight down to the water surface (i.e., shortest path) and then travel along the water surface to the grounding structure. Why this occurs is not the subject of this patent however, it may have something to do with the dielectric constant of water being on the order of 80 times the dielectric constant of air and this would tend to concentrate electric fields at the water surface. A description of lightning strike ground physics can be found in the paper "An examination of Lightning-Strike-Grounding Physics" by C. B Moore, G. D Aulich and W. Rison, Langmuir Laboratory for Atmospheric research, New Mexico Tech, Socorro, N.M.

Since the ionized discharge in the water travels at the water surface, the best place to put the discharge or grounding terminal electrode is also at the surface. If the discharge terminal electrode is above the water surface, there must be a voltage drop between the discharge terminal electrode and the water surface sufficient to sustain the ionization. This same voltage drop would act to increase the voltage potential at the base of the air terminal or sailboat mast and the goal is to keep this potential as small as possible to prevent an uncontrolled discharge from the base of the air terminal to the water surface. By a similar mechanism, if the discharge terminal electrode is below the water surface and the charge must travel up to the water surface, a higher potential can also occur at the base of the air terminal or sailboat mast. An uncontrolled discharge from the base of the air terminal to the water in the sailboat case can result in damage to the hull and also endanger crew inside the sailboat.

In order for the discharge terminal electrodes to float at the water surface, they must be physically removed from the marine vessel but attached to the down conductor. In the preferred embodiment, there are flexible wire conductors between the down conductor and the floating grounding terminal. The wire conductors are of such length and flexibility that as the vessel is heeled over such as during sailing, the floating ground conductor is still at its intended position relative to the water surface. The down conductor must be of both low impedance and low inductance. For example, the down conductor might be made from 2 or 4 gauge-stranded wire. A flat braided cable of equivalent impedance may also be an advantage due to lower inductance. A crimp or a bolt may be used to attach the down conductor to the ground terminal.

The grounding terminal electrode may be of many forms such as the prior art of a conductive plate with various arrangements of sharp edges. Petropoulos (reference G. M Petropoulos, "The high voltage characteristics of earth resistances", JIEEE, vol. 95, pp. 59-70, 1948) found that a 5 cm radius spherical electrode equipped with seven 4 cm long points started producing small sparks at an impulse crest voltage of 28 KV, whereas the 5 cm sphere without points did not produce sparks even at 50 KV. The improvement is the buoyancy incorporated into the ground structure which places it relative to the water surface and portions of the grounding structure may be both above and below the water surface or only above or below. The ground terminal may be made from copper or copper alloy such as alloy C110 or any other material with sufficient corrosion resistance, low impedance and ability to withstand the intense heat which may be generated. The prior art has shown that a one square foot ground plate may have adequate low impedance for salt water but not for fresh water. However, the prior art has also shown that structures which concentrate the electric field such as will be the case with multiple sharp edges and can have lower actual or dynamic impedance per some area than a flat plate. It is also likely that sharp edges or structures which are aligned with the vertical electric field which will be experienced in a lightning storm would also be more effective at lowering the actual or dynamic impedance of the grounding terminal.

DETAILED DESCRIPTION OF THE FIGURES

DETAILED DESCRIPTION OF THE INVENTION

The subject invention pertains to a method and apparatus for lightning protection. The subject method and apparatus can be used to provide lightning protection for a marine vessel or other structures near water.

In a specific embodiment of the invention, a down conductor is mechanically and electrically connected to the air terminal or mast or lightning rod of a boat. The conductor is of sufficient low impedance and inductance so that minimal voltage drop occurs across the conductor for both low and high frequency current transients. The down conductor is connected to a grounding terminal electrode over the side of the vessel or through the vessel. For example, 2 or 4-gauge multi wire flexible copper or copper alloy cable may be used for the down conductor. Or any other flexible conductive structure with both low impedance and low inductance can be used. The grounding electrode incorporates buoyancy such that its relative position to the water surface is maintained. The down conductor must be of sufficient length to allow the grounding electrode to remain at its position relative to the water surface with the vessel heeled over or if there is wave action near the vessel. A preferred embodiment uses two sets of down conductors and buoyant grounding electrodes—one on each side of the vessel. Because both the buoyant electrodes will float and have sufficient down conductor length, both buoyant ground conductors will maintain their position relative to the surface of the water and the impedance and inductance of the system will therefore be one half. The buoyancy may be designed to specifically place the buoyant grounding terminal in a specific location relative to the water surface. For example, more floatation material would place the ground terminal above the water surface. Less flotation would place portions of the ground terminal both below and above the water surface. Even less flotation could place the ground terminal slightly below the water surface.

Buoyancy can be achieved by adding trapped air packets or bladders or with wood or foam or other material which is less dense than the fluid the grounding terminal structure needs to float on. Also, the buoyancy of the buoyant ground conductor structure may achieved by affecting the density of the structure such that is floats with respect to the water surface. The buoyancy can also be achieved and designed such that the ground conductor structure will hydrodynamic plane in a low drag manner at the water surface when the vessel is under way. This has the benefit of maintaining the lightning protection while the vessel is underway but causing essentially no speed loss such as might occur from dragging a large underwater structure. The low drag would be especially important to a sailboat under sail power.

Figure 1:
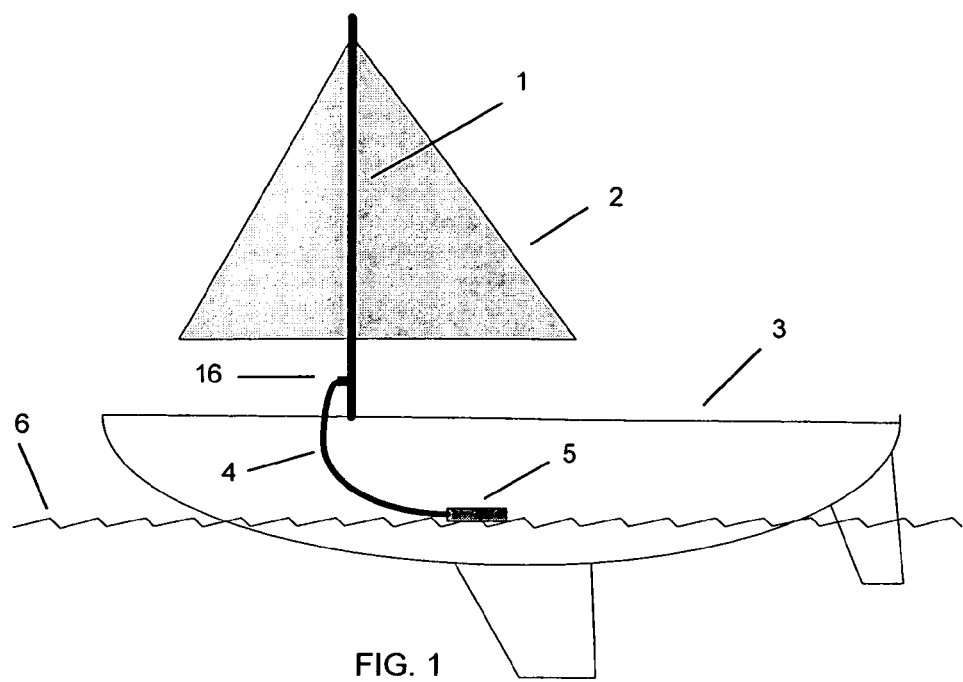
FIG. 1 shows an embodiment of the subject invention on a sailboat with a mast as the air terminal, a down conductor and a buoyant grounding terminal.

FIG. 1 shows a sailboat floating on the water or fluid surface 6 with the down conductor 4 connected to the mast 1 near the deck of the sailboat hull 3. Sailboat mast are typically anodized Aluminum. It may or may not be important to make a good mast to down conductor electrical connection 16 since a poor connection would look like a spark gap and ionization would occur in the lightning event. If a good electrical connection is to be made, one method is to drill a hole in a structurally unimportant portion of the mast near its base and to fasten the down conductor using a washer structure which contains sharp points which will penetrate the oxide surface of the mast. The down conductor 4 is flexible and of sufficient length to allow the buoyant grounding terminal structure 5 to remain at its designed relationship with respect to the fluid surface 6 as the sailboat is being operated and heeling over as will occur from wind in the sails 2. The down conductor 4 may also have extra length near the sailboat mast 1 since some sailboats incorporate rotating masts.

Figure 2:
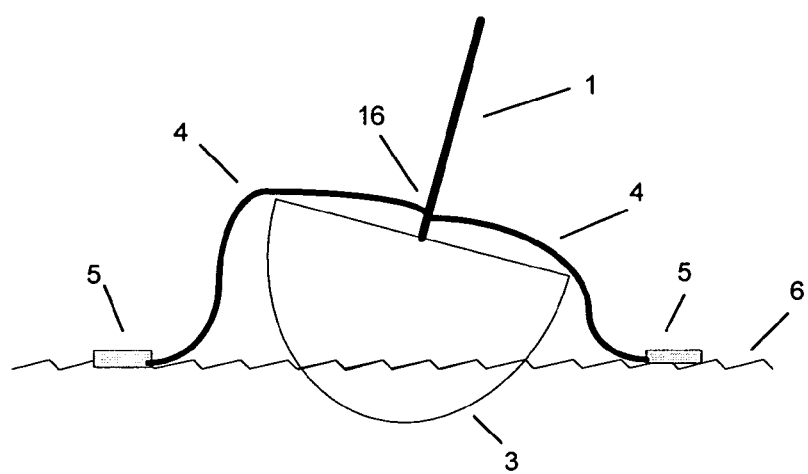
FIG. 2 shows an embodiment of the subject invention of a boat, which is heeling over, down conductors on each side of the boat and buoyant grounding terminal at each end of the down conductor.

FIG. 2 shows a side view of FIG. 1. In this case, the sailboat hull 3 is heeled over and the flexible down conductors 4 are of sufficient length and flexibility to allow the buoyant grounding terminal structure 5 on each side of the sailboat hull 3 to maintain the designed relationship with respect to the fluid surface 6.

Figure 3:
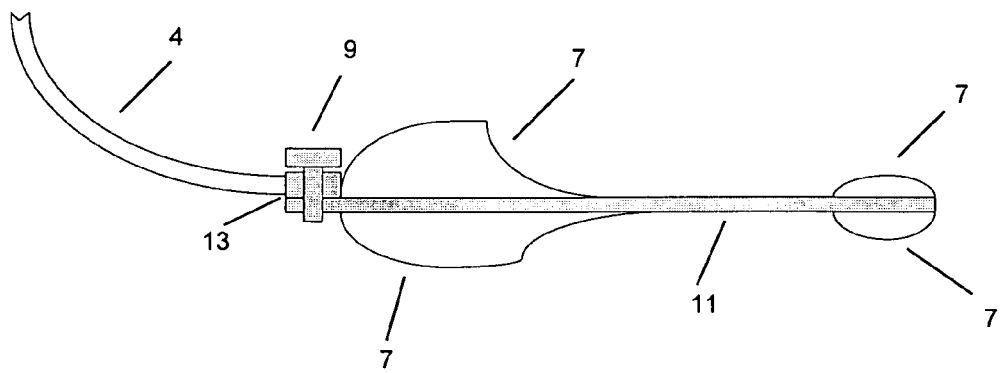
FIG. 3 shows an embodiment of the subject invention of the body of the buoyant grounding terminal at the end of the down conductor and showing the location of the buoyant material on the main body. This is a side view.

FIG. 3 shows details of one embodiment of the grounding terminal structure 5. This is a side view. The end of the down conductor 4 has a crimp 13 at its end and attaches to a grounding terminal main body 11 with a conductive fastener 9. Floatation 7 is attached to portions of the grounding terminal main body 11 such that the desired position of the grounding terminal main body 11 with respect to the fluid surface 6 is maintained by buoyancy. The flotation 7 may be designed to provide low hydrodynamic drag to the fluid surface 6 in the case where the boat hull 3 is moving through the water. The floatation may also be designed to cushion impacts of the grounding terminal structure 5 with the boat hull 3 which are likely to occur if the boat hull 3 is moving through the water.

Figure 4:
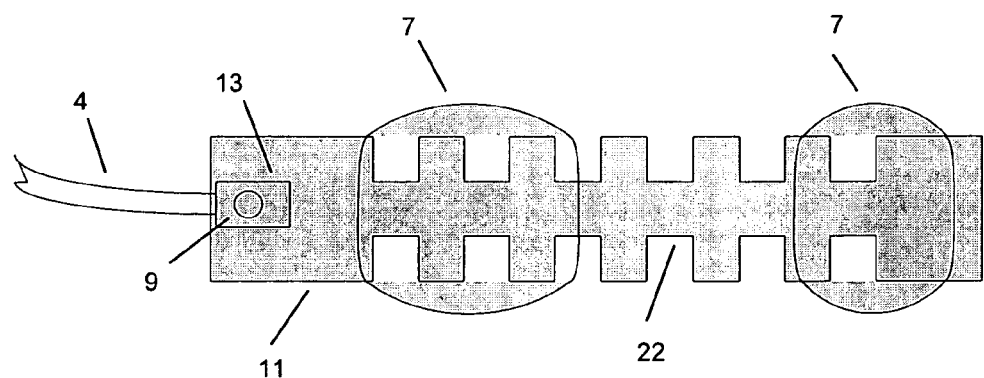
FIG. 4 shows an embodiment of the subject invention of the body of the buoyant grounding terminal at the end of the down conductor. This is a top view.

FIG. 4 shows details of one embodiment of the grounding terminal structure 5. This is a top view. The end of the down conductor 4 has a crimp 13 at its end and attaches to the ground terminal main body 11 with a conductive fastener 9. Floatation 7 is attached to portions of the grounding terminal main body 11 such that the desired position of the main body 11 with respect to the fluid surface 6 is maintained. The flotation 7 may be designed to provide low hydrodynamic drag to the fluid surface 6 in the case where the boat hull 3 is moving through the water. In this example, the grounding terminal main body 11 has multiple cutouts 22 which will increase the edge area and also concentrate electric fields.

Figure 5:
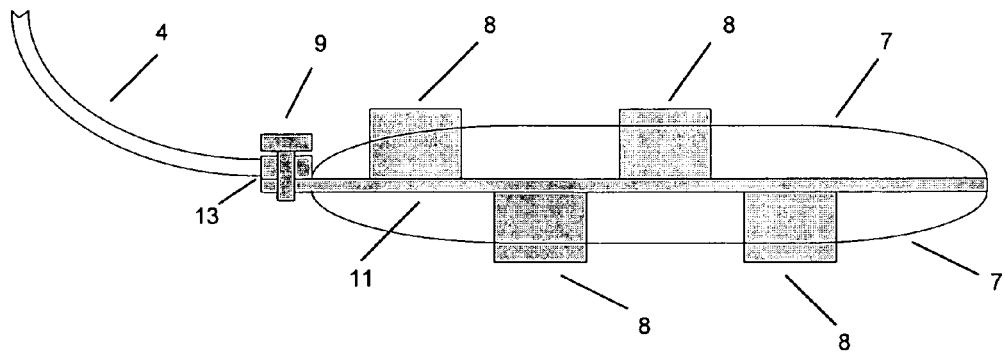
FIG. 5 shows an embodiment of the subject invention which has conductive metal structure either added to the body or punched and formed out of the main body material so as to increase the surface area and number of sharp corners of the buoyant grounding terminal. This is a side view.

FIG. 5 shows details of another embodiment of the grounding terminal structure 5. In this example, the grounding terminal main body 11 has tabs 8 stamped and bent from the material of the grounding terminal main body 11. The purpose of the tabs 8 is to increases edge area and also create sharp points which can increase electric fields. The flotation 7 is once again designed to position the grounding terminal with respect to the water surface and also protect the boat hull 3 from impacts with the grounding terminal when the boat hull 3 is moving through the water.

Figure 6:
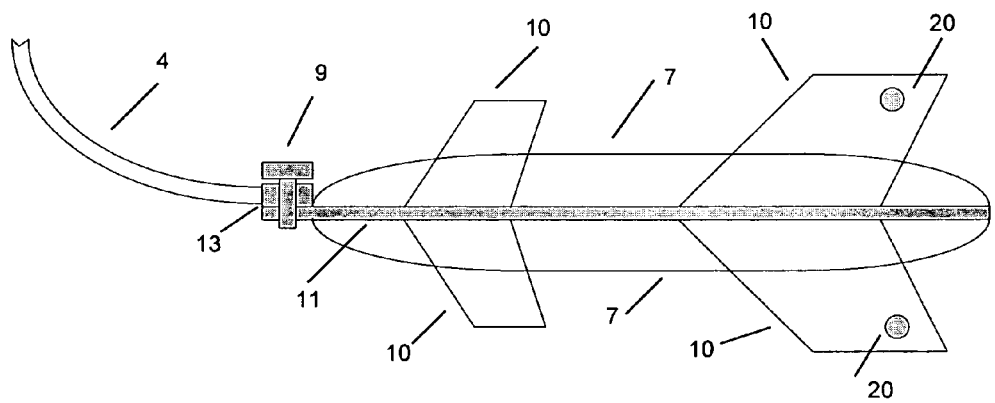
FIG. 6 shows an embodiment of the subject invention which has conductive metal structure added to the main body in order to affect the hydrodynamic flow of the buoyant grounding terminal and to also increase edge area and the number of sharp corners of the buoyant grounding terminal. This is a side view.

FIG. 6 shows details of another embodiment of the grounding terminal structure 5. In this example, conductive fins 10 are added to the grounding terminal main body 11. The purpose of the fins is to both aid hydrodynamic flow properties of the grounding terminal structure 5 when the boat hull 3 is moving through the water and to also increase edge area and create sharp edges to concentrate electric fields. A mounting hole 20 is in the fins 10 so that the grounding terminal structure 5 can be temporarily placed off the water when there is no threat of lightning.

Figure 7:
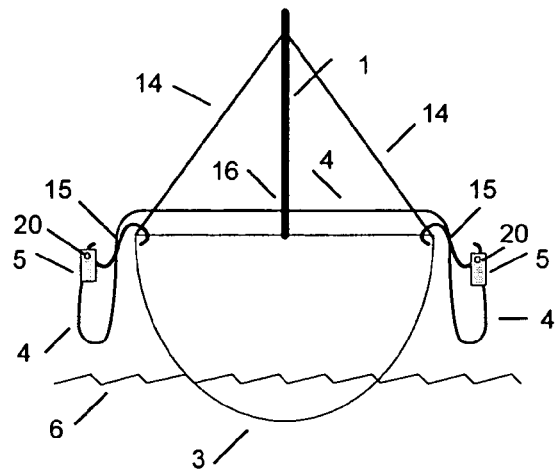
FIG. 7 shows an embodiment of the subject invention where the down conductors have a connection to the sailboat mast stays and also allowing the buoyant ground structure to be hung onto when there is no threat of lightning. This is a front view of a sailboat.

FIG. 7 shows details of the grounding terminal structure 5 in a storage position when there is no threat of lightning. The down conductor 4 has a hook 15 attached to it which can be hung off the sailboat mast shrouds 14. This hook 15 can be electrically conductive with the down conductor 4 such that the down conductor 4 can receive charge from both the mast 1 and the mast shrouds 14. The hook 15 has two ends and the second end can be used to hang the grounding terminal structure 5 is in a storage position using the mounting hole 20 on the grounding terminal structure 5.

In FIG. 7, the down conductor is in close vicinity or is making electrical contact with both the mast 1 and the side mast shrouds 14. It is not shown but separate flexible down conductors could also be attached to both the sailboat front stay and the back stay since each of these can act as an air terminal for lightning attachment. Each of the separate down conductors would have its own buoyant grounding terminal attached to the other end of the flexible down conductor.

Figure 8:
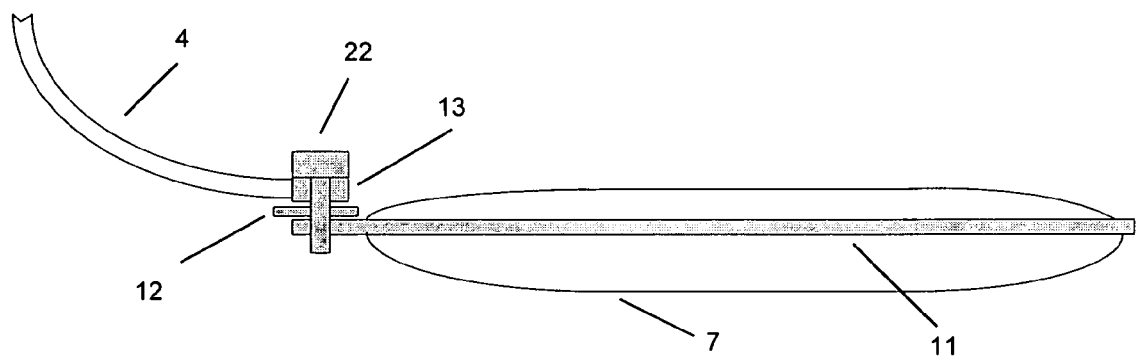
FIG. 8 shows an embodiment of the subject invention where an insulator is used between the down conductor and the buoyant grounding terminal such that the grounding terminal is electrically insulated from the down conductor. This is a side view.

FIG. 8 shows details of a method to electrically insulate the ground terminal main body 11 from the down conductor 4. Whether or not a grounded lightning protection system affects the chances of a sailboat get struck by lightning is beyond the scope of this patent. However, there may be a public perception that a grounded electrode does increase the odds of getting hit. An insulated discharge electrode could be implemented by simply coating the grounding terminal structure 5 with an insulating coating. Another method would be to add an insulation washer 12 between the down conductor 4 end crimp 13 and the grounding terminal main body 11. In the FIG. 7, an insulating fastener 22 or bolt attaches the grounding terminal main body 11 but maintains electrical isolation between the grounding terminal main body 11 and the down conductor 4.

Figure 9:
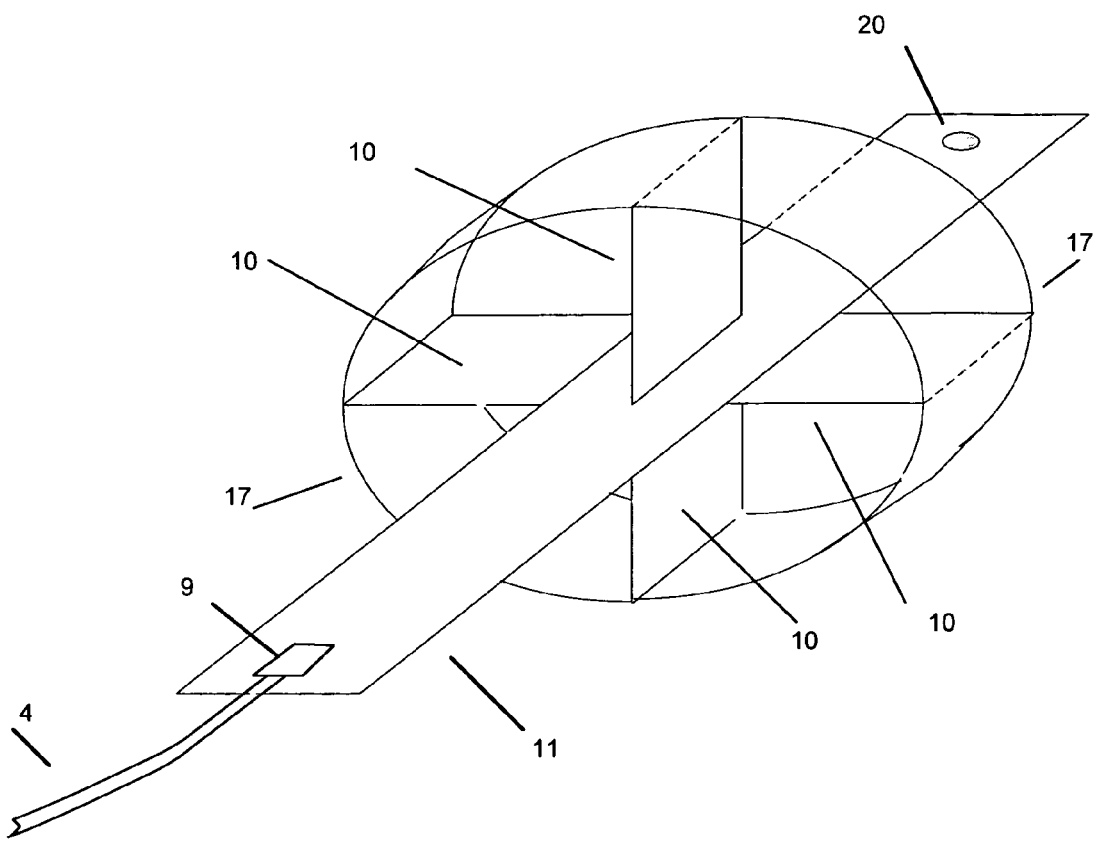
FIG. 9 shows an embodiment of the subject invention which has conductive metal structure added to the main body of the buoyant ground terminal and also a ring on the outside of the additional metal structure which can cushion the buoyant ground terminal from impacts with the boat hull and may also contain the buoyancy.

FIG. 9 shows details of another embodiment of the grounding terminal structure 5. In this example, conductive fins 10 are mounted to the ground terminal main body 11 in a radial manner. The metal fins 10 increase the edge length and also will tend to concentrate electric fields with sharp edges. A ring structure 17 is attached at the conductive fins 10 outer edges. The ring structure 17 is fabricated such that it provides protection from the ground terminal structure 5 knocking into the boat hull 3 when the boat hull 3 is moving through the water and the ring structure 17 also could provide the buoyancy to position the ground terminal with respect to the water surface. A further use of the ring structure 17 would be to provide hydrodynamic control and position with respect to the fluid surface 6 of the grounding electrode if the boat hull 3 is moving.

Figure 10:
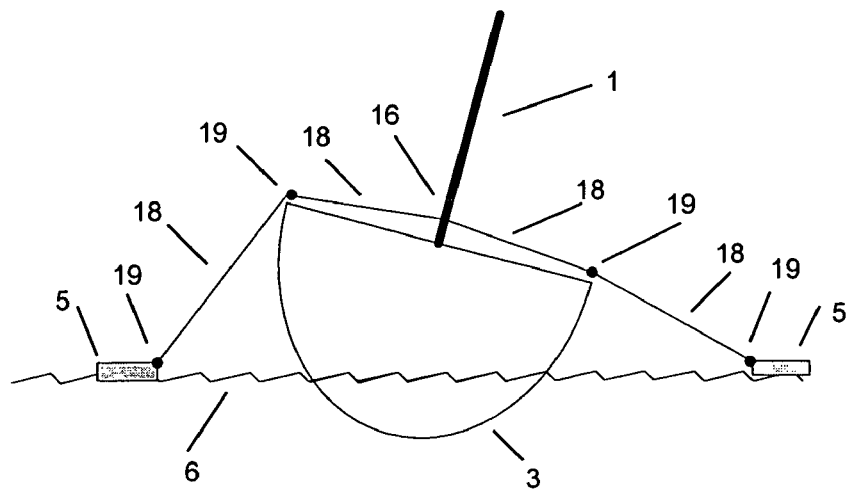
FIG. 10 shows an embodiment of the subject invention where the down conductor flexibility is implemented by rigid conductors with flexible joints.

FIG. 10 shows details of another embodiment of the lightning protection system where the flexible down conductor is composed of rigid conductor 18 connected with rotating or flexible joints 19. In this example, a grounding terminal structure 5 is implemented on each side of the boat hull 3 and connected to the mast 1 at the air terminal to down conductor electrical connection 16 and the flexible system allows the grounding terminal structure 5 to maintain position at the fluid surface 6 even when the boat hull 3 is heeled over from either the forces of wind in the sails or wave action.

Figure 11:
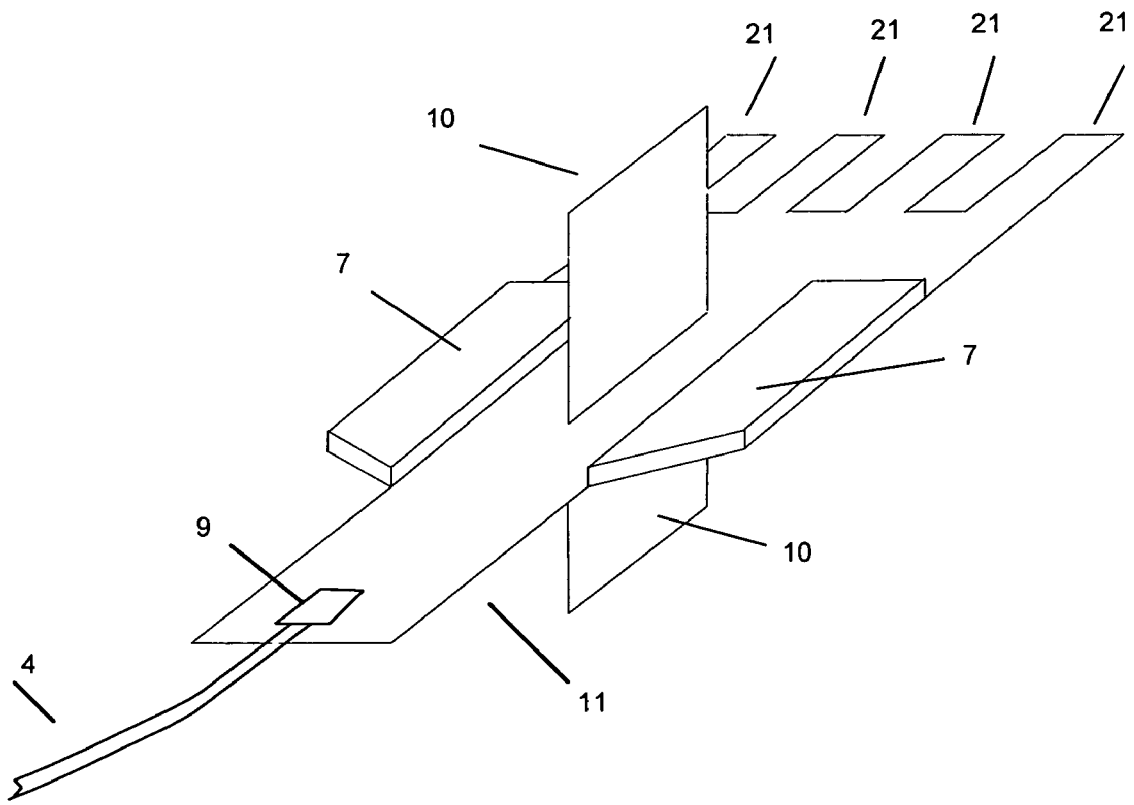
FIG. 11 shows an embodiment of the subject invention where the discharge electrode is additionally positioned at the water surface when the vessel is moving by hydrodynamic planning properties of the discharge grounding terminal.

FIG. 11 shows details of another embodiment of the lightning protection system where the grounding terminal structure 5 has hydrodynamic features 21 added to the grounding terminal main body 11 such that the position of the grounding terminal main body 11 with respect to the fluid surface 6 can be maintained when the boat hull 3 is moving through the water or fluid. In this case, the hydrodynamic features 21 also will concentrate the electric field and will aid in spark creation. In this example, the grounding terminal main body 11 would essentially ride or plane at the fluid surface 6 when the grounding terminal was being pulled by the down conductor 4. However, portions of the grounding terminal structure such as conductive fins 10 could be both above and below the fluid surface 6. Floatation 7 allows the grounding terminal to maintain its position relative to the fluid surface 6 when the grounding terminal is not moving with respect to the fluid surface 6.

While the present invention has been described in the context of specific embodiments thereof, other alternatives, variations, and modifications will be apparent to one of skill in the art after reading the description. It is intended to embrace such alternatives, modifications, and variations as fall within the broad scope of the appended claims.

What is claimed is:

1. A lightning protection system compromising:
   an air terminal mounted on a boat operated on a fluid,
   a flexible down conductor,
   a grounding terminal incorporating buoyancy, wherein the buoyancy positions said grounding terminal with respect to a fluid surface so as to enhance ionizing discharge at the interface between air and the fluid surface regardless of the position of the boat due to heeling or wave action.

2. The apparatus according to claim 1, wherein said grounding terminal is electrically insulated from the fluid.

3. The apparatus according to claim 1, wherein said grounding terminal is electrically conducting to the fluid and portions of said grounding terminal are exposed to air only.

4. The apparatus according to claim 1, wherein said fluid is water.

5. The apparatus according to claim 1, wherein the buoyancy and said grounding terminal are shaped to provide low hydrodynamic drag.

6. A lightning protection system compromising:
   an air terminal mounted on a boat operated on a fluid,
   a flexible down conductor,
   a grounding terminal incorporating buoyancy, wherein the buoyancy positions said grounding terminal with respect to the fluid surface in a position above and near a fluid surface so as to enhance ionizing discharge at the interface between air and the fluid surface regardless of the position of the boat due to heeling or wave action.

7. The apparatus according to claim 6, wherein said grounding terminal is electrically insulated from the fluid.

8. The apparatus according to claim 6, wherein the fluid is water.

9. The apparatus according to claim 6, wherein the buoyancy and said grounding terminal are shaped to provide low hydrodynamic drag.

10. A lightning protection system compromising:
    an air terminal mounted on a boat operated on a fluid,
    a flexible down conductor,
    a grounding terminal incorporating hydrodynamic planning structure, wherein the hydrodynamic planning structure positions said grounding terminal with respect to the fluid surface so as to enhance ionizing discharge at the interface between air and the fluid when the ground conductor structure is moving relative to the fluid.

11. The apparatus according to claim 10, wherein said grounding terminal is electrically insulated from the fluid.

12. The apparatus according to claim 10, wherein said grounding terminal is electrically conducting to the fluid.

13. The apparatus according to claim 10, wherein the fluid is water.

14. The apparatus according to claim 10, wherein the hydrodynamic planning structure and said grounding terminal are shaped to provide low hydrodynamic drag.

* * * * *